United States Patent [19]

MacIsaac

[11] Patent Number: 4,883,498
[45] Date of Patent: Nov. 28, 1989

[54] ARTIFICIAL FIRELOG

[75] Inventor: John E. MacIsaac, Beloit, Ohio

[73] Assignee: Sebring Forest Industries, Inc., Sebring, Ohio

[21] Appl. No.: 214,495

[22] Filed: Jul. 1, 1988

[51] Int. Cl.$^4$ ............................................. C10L 11/06
[52] U.S. Cl. ........................................ 44/532; 44/535
[58] Field of Search .................. 44/14, 522, 532, 535, 44/542

[56] References Cited

U.S. PATENT DOCUMENTS

| 225,244 | 3/1880 | Swift | 44/39 |
| 1,050,535 | 1/1913 | Hartung | 44/38 |
| 2,789,890 | 4/1957 | Stevens | 44/41 |
| 3,637,355 | 1/1972 | Brockbank | 44/1 |
| 3,726,651 | 4/1973 | Ronden | 44/14 |
| 3,947,255 | 3/1976 | Hartman et al. | 44/10 |
| 4,040,796 | 8/1977 | Vincent et al. | 44/14 |
| 4,046,518 | 9/1977 | Dalzell | 44/10 |
| 4,104,034 | 8/1978 | Wu et al. | 44/535 |
| 4,147,518 | 4/1979 | DeHart | 44/13 |
| 4,243,394 | 1/1981 | Kincaid | 44/14 |

Primary Examiner—Carl F. Dees
Attorney, Agent, or Firm—Michael Sand Co.

[57] ABSTRACT

An artificial firelog is formed of an elongated flammable body of compressed sawdust and a wax binder which is sealed within a flammable outer protective wrapper. A groove, generally dovetailed-shaped in transverse cross section, extends throughout the longitudinal length of the body in a vertical lower portion of a front surface of the body. The upper portion of the front surface is inclined rearwardly and terminates in a horizontal top surface. The groove forms a venturi air passage within the wrapper interior which creates a draft to accelerate burning of the wrapper and the flammable body along the top of the groove when the wrapper is ignited adjacent one end of the groove. A second groove is formed in the top surface of the body to control the weight of the body during the extrusion forming thereof.

11 Claims, 2 Drawing Sheets

ARTIFICIAL FIRELOG

TECHNICAL FIELD

The invention relates to artificial firelogs and particularly to an artificial fast-lighting firelog contained within a protective outer wrapper. More particularly, the invention relates to a firelog having a venturi groove formed in the front face thereof which accelerates lighting of the protective wrapper and flammable body or log contained therein.

BACKGROUND ART

Various types of artificial fuels and firelogs have been developed, most of which are formed of particulate flammable materials which are compressed into a predetermined shape. The particulate materials are combined with various wax binders or other resins for maintaining the desired shape of the final fuel body. These bodies also may contain various types of chemicals therein to enhance burning or to produce a colored flame.

Certain of these artificial fuels and in particular, the elongated fuel body referred to as a firelog, are formed of compressed sawdust, coal particles or other flammable material. Examples of prior art artificial firelogs are shown in U.S. Pat. Nos. 225,244, 1,050,535, 2,789,890, 3,637,355, 3,726,651, 3,947,255, 4,040,796, 4,147,518, 4,046,518, and 4,243,394.

These firelogs are formed usually by a continuous extrusion process wherein the particulate flammable material and the appropriate binder and other materials are compressed within an extrusion bore, and then are cut into predetermined lengths, and subsequently placed in a protective outer wrapper. Examples of such prior art extrusion processes are shown in several of the above referenced patents.

These firelogs are generally used by residential homeowners in a home fireplace to provide heat, and to provide an attractive fire closely simulating that of a natural wood fire. It is a common object of most artificial firelogs to provide some type of means for rapidly igniting the firelog, preferably when a match is applied to the outer wrapper, eliminating the need of any starting fuels which could be a safety hazard. It is also desirable that the log burns uniformly instead of at one or both ends only thereof, after being ignited by a starting match.

U.S. Pat. No. 4,040,796 in an attempt to provide uniform lighting and quick ignition of the firelog, forms a groove extending throughout the longitudinal length of the log which is filled with a quick ignition material. However, this construction, although providing a satisfactory quick-starting log, increases the cost of the log by the required addition of the quick ignition fuel-filled notch. Other prior art firelogs include quick ignition chemicals in the log itself. Other prior art firelogs attempt to increase the burning by forming a plurality of ridges and grooves to increase the surface area of the log such as shown in U.S. Pat. No. 3,726,651.

Another problem in the manufacturer of artificial firelogs is to control the weight of the flammable body, so as to meet the weight specifications thereof that is noted on the exterior of the wrapper, without excessively exceeding this required weight which results in increased usage of material, thereby increasing the cost of the firelog.

DISCLOSURE OF THE INVENTION

Objectives of the invention include providing an improved artificial firelog comprising a flammable body formed of a compressed particulate material and a binder such as sawdust and wax, which is contained in a protective outer wrapper; and in which the wrapper is ignited, preferably at both ends by a single match, which quickly burns away the outer wrapper and ignites the flammable body contained therein.

Another objective is to provide such a firelog in which the flammable body is formed with a longitudinally extending venturi groove in a front surface thereof, which forms an air tunnel inside of the wrapper, whereby the flame upon igniting one or both ends of the wrapper adjacent the venturi groove, spreads quickly along the wrapper and upper edge of the groove of the body within the wrapper due to the turbulence and draft created within the groove to quickly ignite the flammable body completely along the front face thereof; and in which the flame spreads quickly across a rearwardly inclined front surface to ignite the entire body generally uniformally instead of at one or two spaced locations as in many prior art artificial firelogs, without requiring additional quick ignition chemicals or other starting fuels within the flammable body.

A still further objective of the invention is to provide such a firelog in which a second groove is formed in a top surface of the flammable body by an adjustable die insert during the extension forming of the body, to accurately control the weight of the final firelog so that it meets the required weight specified on the package without excessively exceeding the weight requirements, thereby resulting in a savings of material and reduced cost per log.

Still another objective is to provide such a firelog in which a strip of quick lighting ignition material may be applied to one or both ends of the firelog to increase further the ignition of the entire log. A further objective of the invention is to provide such a firelog in which the weight control groove formed in the top surface of the flammable body also creates an air movement path to facilitate the rapid ignition of the wrapper along the entire top surface of the body, which in combination with the venturi groove, quickly ignites the entire log to provide a more attractive effect and to promote uniform burning of the firelog once ignited in the fireplace.

Still another objective of the invention is to provide such a firelog in which the user thereof need not remove the flammable body from within the protective wrapper, and which requires the user to ignite the wrapper at one or both ends adjacent the venturi groove which provides a quick ignition of the entire body without having the user to unwrap or remove the outer wrapper and be exposed to the particulate compressed material contained therein, thereby eliminating any mess or soiling of the users hands or clothing or surrounding area adjacent the fireplace.

A further objective of the invention is to provide such an artificial firelog in which printed indicia quickly indicates to the user of the firelog where to ignite the wrapper to achieve the venturi draft effect caused by the venturi groove formed in the log and hidden within the wrapper interior.

A still further objective is to provide such a firelog in which the majority area of the front surface is inclined rearwardly, and is located above the venturi groove, enabling the flame formed along the top edge of the venturi groove to quickly engage and ignite the front surface throughout the entire length and height of the flammable body, generally followed quickly thereafter, by the ignition of the entire top surface of the body due to the presence of the depth control groove formed in the top surface.

These objectives and advantages of the invention are obtained by the improved artificial firelog of the invention, the general nature of which may be stated as including: an elongated flammable body formed of compressed particulate material and a binder, said body having a pair of opposed end surfaces, a rear surface, a bottom surface, a top surface and a front surface, said front surface having a rearwardly inclined upper portion and a generally vertical lower portion; groove means formed in the vertical lower portion of the front surface and extending throughout the length of the body for creating venturi air currents along said groove means to facilitate ignition of said body; a protective wrapper formed of a flammable material enclosing the elongated body, said wrapper generally conforming to the external configuration of said body; and printed indicia on the wrapper indicating to ignite said wrapper adjacent one end of the venturi groove means.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 1:
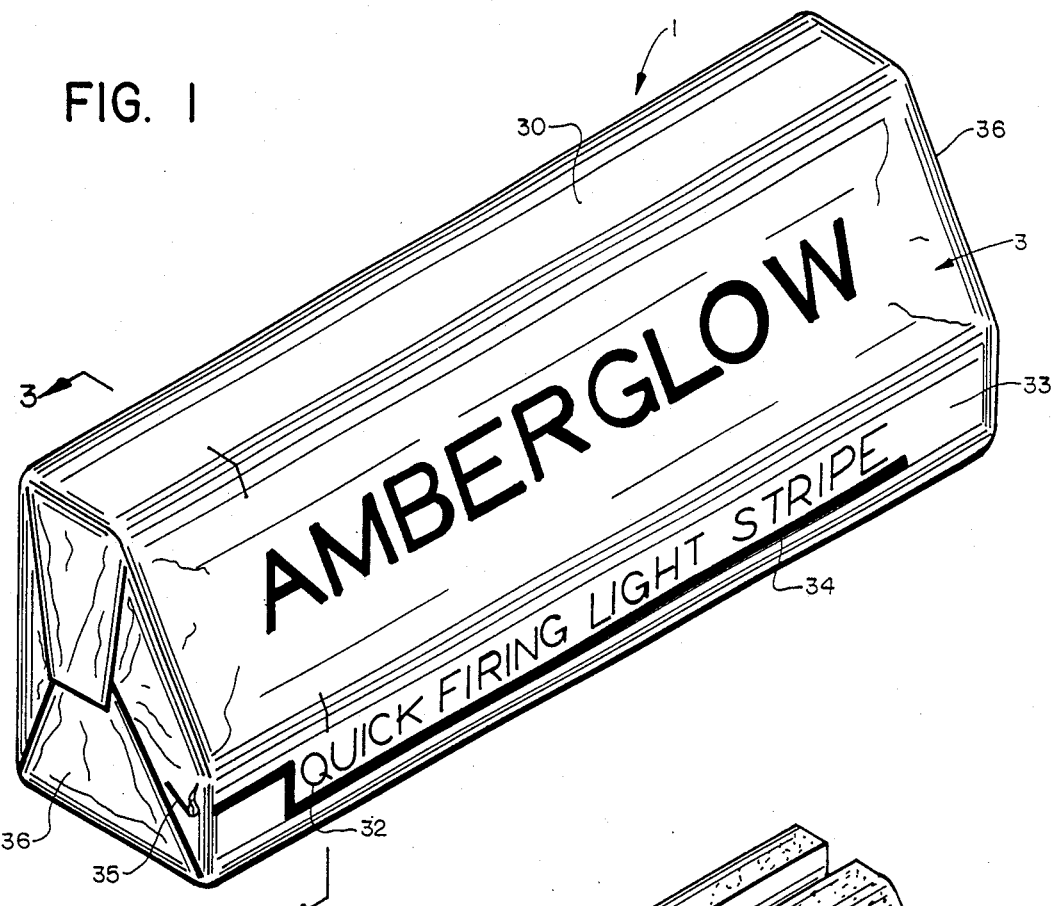
FIG. 1 is a perspective view showing the improved artificial firelog of the invention.
Figure 2:
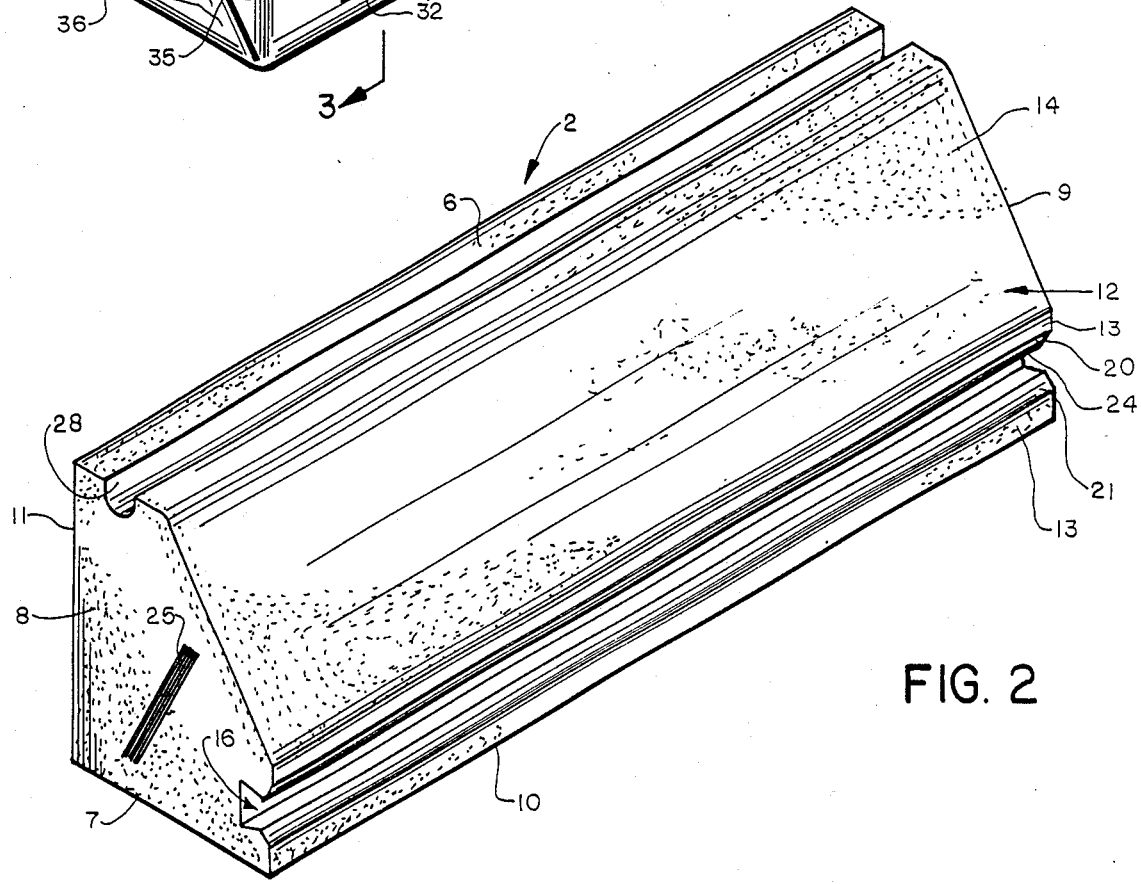
FIG. 2 is a perspective view showing the elongated flammable body removed from the outer wrapping as shown in FIG. 1.
Figure 3:
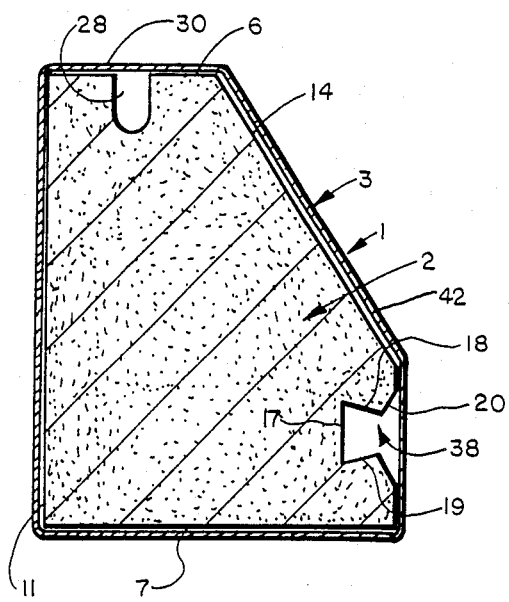
FIG. 3 is a transverse sectional view taken on line 3—3, FIG. 1.

The improved artificial firelog of the invention is indicated generally at 1, and is shown particularly in FIGS. 1 and 2. Firelog 1 includes an elongated flammable body 2 and an outer protective wrapper 3 which completely encloses and seals body 2. Body 2 is formed of a particulate flammable material such as cellulose particles, coal particles and other materials well known in the art. This particulate material is maintained in a predetermined shape by means of a wax binder or other flammable resin material also well known in the art. The preferred composition of body 2 of the present invention is a mixture of compressed sawdust and a wax binder. However, this composition may vary without affecting the concept of the invention. Body 2 is formed preferably by an extrusion process by forcing the compressed material through an extrusion die indicated generally at 5 (FIG. 5), which has the particular shape of the flammable body formed therein.

In accordance with the invention, flammable body 2 has horizontal parallel, top and bottom surfaces 6 and 7, respectively, parallel vertical end surfaces 8 and 9, and a vertical rear surface 11. The front surface of flammable body 2 which is indicated generally at 12, is formed by a lower generally vertically extending front portion 13, and a rearwardly inclined upper portion 14.

Figure 6:
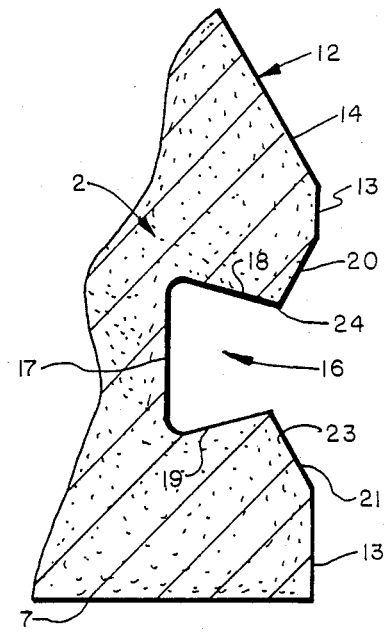
FIG. 6 is an enlarged fragmentary sectional view showing the venturi groove formed in the front face of the flammable body.

In accordance with the main feature of the invention, a venturi groove indicated generally at 16, is formed in lower portion 13 of front surface 12, and extends longitudinally throughout the entire length of body 2. Groove 16 as shown particularly in FIG. 6, is dovetail-shaped formed by a rear wall 17 and vertically spaced outwardly converging groove forming surfaces 18 an 19. Dovetail forming surfaces 18 and 19 terminate in top and bottom outwardly diverging surfaces 20 and 21, respectively, which extend throughout the longitudinal length of groove 16 to form an enlarged opening 23 communicating with the dovetail-shape of groove 16. Surfaces 20 and 21 terminate into lower vertical portion 13 of front surface 12 as shown in FIG. 6. Top surface 20, preferably is of a smaller width and extends at a steeper angle than that of bottom surface 21 to form a somewhat sharp edge 24 extending along the top of the opening to the dovetail-shaped venturi groove.

Figure 5:
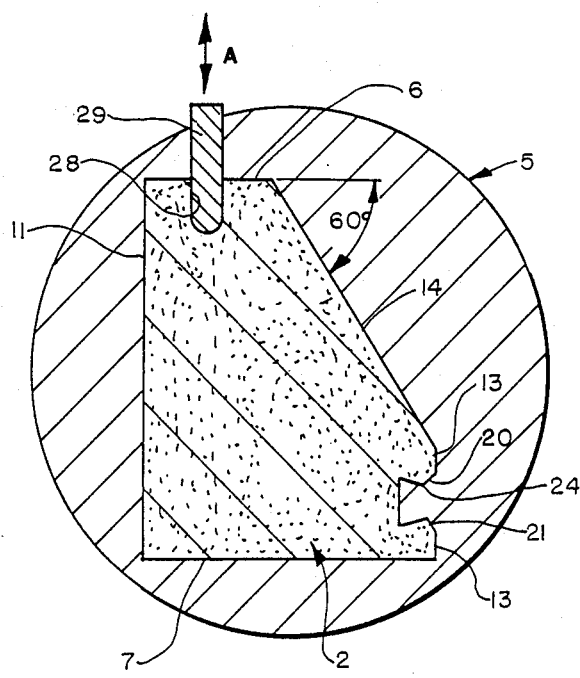
FIG. 5 is a transverse sectional view showing the extrusion forming of the flammable body in a extrusion die.

In the preferred embodiment, the vertical height of body 2 is approximately 4⅛", with a width of 3⅛" defined by bottom surface 7, with top surface 6 generally being one-half the length of bottom surface 7, preferably 1⅛". Also, lower portion 13 of front surface 12 extends vertically a distance approximately one-third of the total vertical height of the body defined by rear surface 11. Inclined upper portion 14 of front surface 12 preferably extends at an angle of 60° with respect to the horizontal as shown in FIG. 5, thereby forming an included angle with top surface 6 of 120°. Although, this particular shape and size of body 2 may vary without affecting the concept of the invention, this dimensional relationship, especially the cross-sectional configuration of venturi groove 16, is believed to provide the most desired and effective results.

For certain applications a strip of quick-starting ignition material 25 may be applied to one or both end surfaces 8 and 9 of body 2 as shown particularly in FIG. 2. The application of such an ignition strip may be desirable for only certain applications, but is not required to achieve the benefits of the invention which are provided particularly by venturi groove 16.

In accordance with another feature of the invention, a depth control groove 28 is formed in top surface 6 of body 2 during the extrusion forming of the body as shown in FIG. 5. Groove 28 is formed by an insert die 29 which is adjustably mounted within die 5 as shown by arrow "A", so that the depth of groove 28 may be readily adjusted to provide a rapid means of varying the overall weight of the flammable body. During the formation of flammable body 2, a particular minimum weight must be achieved to conform with the indicated weight on the outer wrapper 3. However depending upon the particular particulate material being used and its density, which is effected by moisture content and other factors difficult to accurately control, the weight of the final body 2 may vary somewhat from the designed and intended weight. If too much material is added to each flammable body than that necessary to achieve the required weight, it will increase the cost per firelog and reduce profits to the manufacturer. Therefore, by vertical adjustment of insert die 29, the weight of each body 2 can be accurately controlled during the extrusion forming thereof.

Depth control groove 28 also has the increased benefit of providing for air movement therethrough as to increase the burning of the top portion 30 of wrapper 3 by creating a draft underneath wrapper portion 30 in a somewhat, although not as effective as, the draft created within venturi groove 16.

In accordance with another feature of the invention, printed indicia 32 will extend along front lower portion 33 of wrapper 3, preferably in combination with an indicating stripe 34, showing the location of the venturi groove inside of the wrapper. This indicia, in combination with additional indicating markers 35, which instruct the user as to the location where a match should be applied to ignite wrapper 3, enables the user of the improved firelog to obtain the most beneficial results as shown in FIG. 1. Preferably a marker 35 is placed on the wrapper end panels 36 at both ends of body 2, and together with appropriate instructions printed on the wrapper instructs the user to ignite both end locations of the wrapper adjacent the ends of groove 16.

Figure 4:
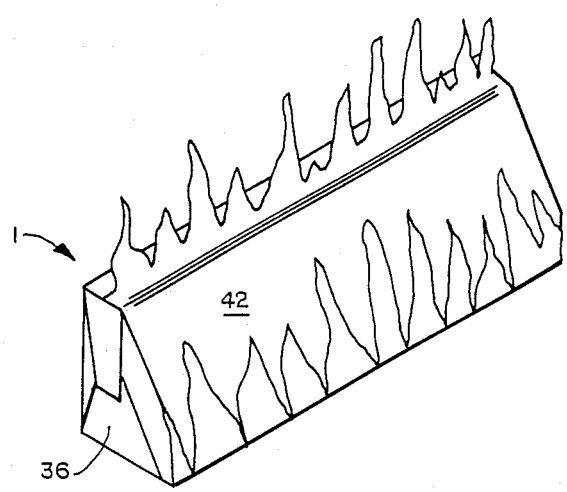
FIG. 4 is a diagrammatic perspective view showing the ignition of the outer wrapper along the venturi groove and top weight control groove after igniting the outer wrapper.

Since wrapper 3 is formed of a flammable material, a match applied at both ends thereof will quickly ignite the wrapper due to the air tunnel indicated at 38, formed in cooperation with venturi groove 16 within the interior of wrapper 3. Tunnel 38 will create a turbulence or air current along the entire length of groove 16 causing the flame to spread completely along the front of the wrapper as shown in FIG. 4 adjacent groove 16. This will result in the flammable body being quickly ignited, and in particular top edge 24 of the venturi groove formed by surfaces 18 and 20.

Edge 24 will quickly ignite and the flames will curl upwardly and around surface 20 and the upper area of lower front portion 13, quickly igniting body 2 throughout the entire longitudinal length of the body. The flames quickly ignite the inclined portion 42 of the wrapper, adjacent inclined upper portion 14 of the flammable body, igniting this area of body 2. The flames then quickly spread to the upper area of inclined wrapper portion 42, and spreads quickly along the longitudinal length thereof, aided by the air current within depth control groove 28.

Thus igniting the end panels of wrapper 3 adjacent the ends of venturi groove 16, will quickly ignite the entire front portion of the outer wrapper and correspondingly the upper edge of venturi groove 16. The flames then quickly spread along the entire length of the groove and upwardly along the front surface of body 2 and then to the top surface of the wrapper, and correspondingly to the top surface of body 2 to quickly engulf the body in flames. This provides for a uniform burning of body 2 instead of localized burning as occur in many prior art artificial firelog constructions.

It is believed that the particular dovetail-shaped configuration of venturi groove 16, in combination with the enlarged outer opening thereof, creates air turbulence within the groove and air tunnel to assist in moving the air currents therealong. The shape of upper edge 24 of the venturi opening provides an area which is quickly ignited by the adjacent burning of the outer wrapper.

Accordingly, the artificial firelog is simplified, provides an effective, safe, inexpensive, and efficient which achieves all the enumerated objectives, provides for eliminating difficulties encountered with prior firelogs, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description nd illustration of the invention is by way of example, and the scope of the invention is not limited to the exact details shown or described.

Having now described the features, discoveries and principles of the invention, the manner in which the improved artificial firelog is constructed and used, the characteristics of the construction, and the advantageous, new and useful results obtained; the new and useful structures, devices, elements, arrangements, parts, and combinations, are set forth in the appended claims.

What is claimed is:

1. An artificial firelog including, an elongated flammable body formed of compressed particulate material and a binder, said body having a front surface; generally dovetailed-shaped groove means formed in the front surface by spaced upper and lower inwardly extending surfaces, and groove means extending throughout the length of the body for creating venturi air currents along said groove means to facilitate ignition of said body, said upper surface of the groove means forming an included angle of less than 90 degrees with the front surface and forming an upper edge therebetween; and a protective wrapper formed of a flammable material enclosing the elongated body, said wrapper generally conforming to the external configuration of said body, whereby when said wrapper is ignited the flames will burn through the wrapper and easily ignite the upper edge of the groove means and create a turbulent air current along the entire groove means for subsequently spreading the flame along the upper edge and for igniting said front surface.

2. The firelog defined in claim 1 in which second groove means is formed in a top surface of the elongated body and extends throughout the length thereof for controlling the weight of said body.

3. The firelog defined in claim 1 in which the body is formed of a mixture of sawdust and a wax binder.

4. The firelog defined in claim 1 in which a marking stripe is printed on and extends along the wrapper generally adjacent the location of the venturi groove means concealed within the wrapper.

5. The firelog defined in claim 1 in which the elongated body includes a pair of parallel end surfaces; and in which a quick ignition material is applied to a portion of at least one end surface of the flammable body.

6. The firelog defined in claim 1 in which the elongated body includes an inclined upper portion on the front surface of the flammable body which forms an included angle with a top surface of approximately 120°.

7. The firelog defined in claim 1 in which the elongated body includes a vertical lower portion of the front surface which is approximately one-third of the total vertical height of the elongated body.

8. The firelog defined in claim 6 in which the inclined upper portion of the front surface is inclined at an angle of generally 60° to the top surface which is horizontal.

9. The firelog defined in claim 1 in which the venturi groove in cross-sectional configuration includes a vertical rear surface.

10. The firelog defined in claim 2 in which the top surface is approximately one-half the width of a generally flat bottom surface.

11. The firelog defined in claim 1 in which the protective wrapper extends generally vertically along the front surface and forms a longitudinal air passage within the wrapper in combination with the venturi groove means.

* * * * *